WIDE-RECORD NARROW-READ MAGNETIC HEAD

Filed April 9, 1964 2 Sheets-Sheet 1

INVENTOR.
ELEUTHERE POUMAKIS
BY
Douglas M. Clarkson
ATTORNEY

Nov. 14, 1967 E. POUMAKIS 3,353,168

WIDE-RECORD NARROW-READ MAGNETIC HEAD

Filed April 9, 1964 2 Sheets-Sheet 2

INVENTOR
ELEUTHERE POUMAKIS
BY
Douglas M. Clarkson
ATTORNEY

United States Patent Office 3,353,168

Patented Nov. 14, 1967

3,353,168

WIDE-RECORD NARROW-READ MAGNETIC HEAD

Eleuthere Poumakis, East Islip, N.Y., assignor to Potter Instrument Company, Inc., Plainview, N.Y., a corporation of New York Filed Apr. 9, 1964, Ser. No. 358,564
4 Claims. (Cl. 340—174.1)

Figure 1:
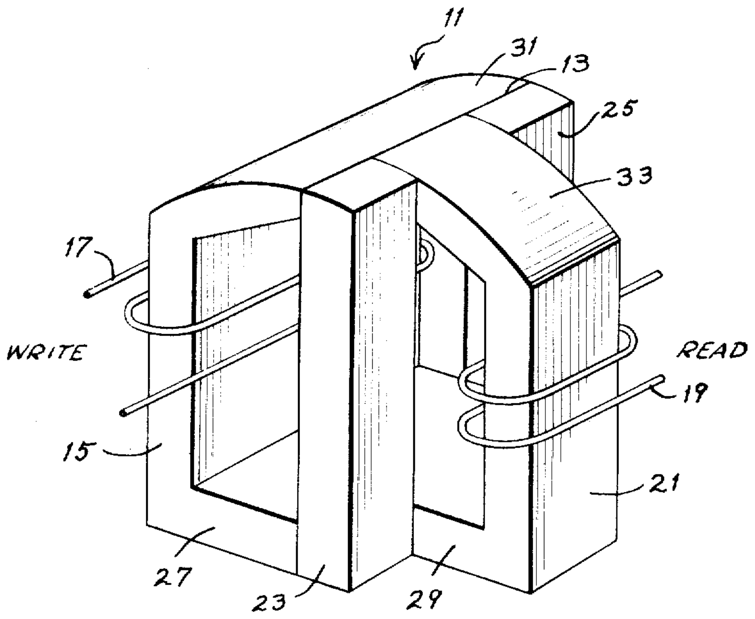

The present invention, generally, relates to magnetic transducer heads and, more particularly, to a magnetic head operable to record on a wide track and reproduce from a narrower track.

Information is recorded on a magnetic medium by means of a magnetic head positioned adjacent the medium. Relative movement between the magnetic head and medium then creates tracks of information on the surface of the medium. For instance, data is recorded in tracks on a magnetic tape usually by moving the tape past a stationary magnetic head, the latter being energized by an electric current containing the information desired to be recorded on the tape.

In many instances, it is desirable to use magnetic tape recording systems which utilize magnetic heads that record new data over the previously recorded tracks. In such systems, however, a problem arises because the tape does not always align in the same lateral position with respect to the magnetic head. This can be caused by the tape sprockets sliding laterally on their axes, the tape slipping laterally in the tape reels, the difficulty of keeping long lengths of the flexible tape moving perfectly straight, or for a variety of other reasons.

When a magnetic head records new binary information over a previously recorded track, the slight lateral shift of the tape during this new recording operation permits the old recorded information to be left on one side or the other of the new track. Then, when the binary data is reproduced by the magnetic head during the reproducing phase of operation, the lateral shift of the tape permits the old information to be reproduced along with the new information. Signals with a low signal-to-noise ratio result, which are undesirable, of course.

In order to overcome this problem, a head in accordane with the present invention develops a recording along a wider strip of track than is scanned during the reproducing process. The difference in the width of the pass when the head is used for recording and reproducing will accommodate the mechanical misalignment between the track and the head without affecting the readout signal to any appreciable extent.

Accordingly, a principal object of the present invention is to provide a single magnetic head adapted to magnetically record data on a wide track of a magnetic medium and reproduce the recorded data from a track of a narrower width.

Another object of this invention is the provision of a magnetic head with its full width operable for recording magnetic data and being further operable to utilize only a portion of this entire width for reproducing the recorded data.

A further object of this invention is to provide a magnetic head having a novel structural arrangement of the recording coil and the reproducing coil on a single core piece.

Still another object of this invention is the provision of a magnetic head in which spurious signals are minimized during the reproducing of data from a magnetic medium.

A still further object of this invention is the provision of an improved magnetic head for recording and reproducing binary information.

It is also an object of this invention to provide an improved magnetic head which is simple in construction and economical to manufacture.

Yet another object of this invention is the provision of an improved magnetic head utilizing separate coils for recording and reproducing.

A still further object of this invention is to provide an improved magnetic head which can control the width of recording and reproducing tracks individually.

The foregoing and other objects and advantages of this invention are obtained by providing a magnetic head having a single core with an air gap for positioning transversely to a path of movement of a magnetic recording medium. The air gap is defined on its one side by a continuous portion of magnetic permeable material for the full width of the head. The other side of the air gap is defined by three sections of magnetic permeable material with nonmagnetic spacers between each of the end sections and the center section.

A first coil, which can be utilized for recording (writing), is wound around the single, full-width portion of the magnetic head. Wound about the middle section of the other half of the magnetic head is a second coil for reproducing. The single width half of the magnetic head is extended at its base to join the bases of the three sections of the other half of the magnetic head, thus providing a closed magnetic circuit.

The arrangement above provides a wide recording track, while providing a narrower reproducing track, the latter being dependent upon the width of one of the three sections.

Figure 2:
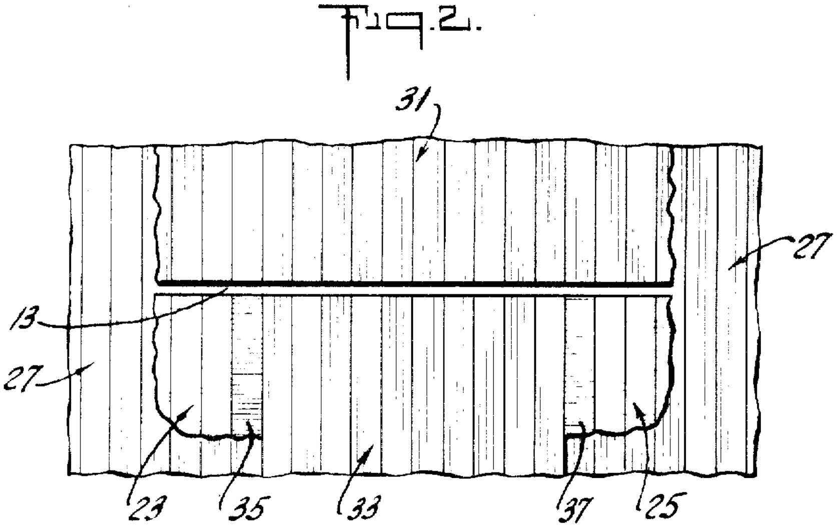

A better understanding of the present invention as well as further objects and advantages will become readily apparent as the following detailed description unfolds and when taken in conjunction with the accompanying drawings, wherein:

FIG. 1 depicts an enlarged perspective view of an embodiment of the present invention; and FIG. 2 is a magnified view of the central part of the air gap of the magnetic head of FIG. 1.

With reference now to the drawings, FIGS. 1 and 2 illustrate a preferred form of a magnetic head constructed in accordance with the principles of the present invention. The magnetic head includes a magnetic core, indicated generally by a reference numeral 11, made from a material of high magnetic permeability. Extending across the width of the core 11 is an air gap 13. A coil 17 is wound around one leg 15 of the core 11, and another coil 19 is wound around another leg 21 of the core 11, this leg 21 being of a width less than the total width of the air gap 13 and being located on the opposite side of the air gap 13 from the leg 15. A pair of core legs 23 and 25 are positioned on the same side of the air gap 13 as the core leg 21 but on opposite sides of the core leg 21 and, the three core legs 21, 23 and 25 make up a width equal to the full width of the opposite core leg 15.

Bases 27 and 29 interconnect the lower ends of the core legs 15 and 21, and the base 27 also interconnects the lower ends of the core legs 23 and 25 with the core leg 15. The upper ends of the core legs 15 and 21 are provided with extensions 31 and 33 which extend toward each other to define the central part of the air gap 13, particularly that part of the gap seen in FIG. 2. The ends of the air gap 13 are defined by the extension 31 and the two core legs 23 and 25.

As shown in FIG. 2, a non-magnetic shim or spacer 35 separates the extension 33 of the core leg 21 and the upper end of the core leg 23. At the other side of extension 33, another non-magnetic shim or spacer 37 is provided to separate the core leg 21 and the extension 33 from the core leg 25. These spacers 35 and 37 act to prevent magnetic flux from passing between the core legs 23 and 25 and the leg 21 during the reading out of information from a magnetic medium.

The magnetic core 11 is formed of laminations whose contours can be selected as desired. The core leg 15 preferably is constructed of a plurality of C-shaped laminations making up the full width of the magnetic core. Likewise, the core leg 21 consists of a plurality of C-shaped laminations, but of a number less than those comprising the core leg 15. Both of the core legs 23 and 25 are preferably constructed of a plurality of I-shaped laminations which fill in that portion of the magnetic core 11 on opposite sides of the core legs 21 to make up the full width of the magnetic head 11, which is actually the width of the core leg 15.

From the above description it can be noted that the magnetic head of the present invention defines two magnetic circuits. One magnetic circuit is traced from the core leg 15, through the extension 31, over the air gap 13, through the core legs 23 and 25 and including the core leg 21 and its extension 33 and base 29, and finally completing the circuit through the base 27 back to the core leg 15. A second magnetic circuit is traced from the core leg 21, across the two bases 29 and 27, through the core leg 15, over the extension 31, across a middle part of the air gap 13, and back through the extension 33 to the core leg 21. This second magnetic circuit is effectively isolated from the core legs 23 and 25 by means of the non-magnetic spacers 35 and 37.

It will be understood that the dimensions of FIG. 1, and those of FIG. 2, are not necessarily representative of the dimensions used since the actual dimensions are too small in some instances to be shown accurately. Accordingly, the view in FIG. 2 of the air gap area has been magnified to show more clearly the part of the magnetic head which is positioned adjacent the magnetic medium upon which information is to be recorded and to show the laminations of the magnetic core 11 more clearly.

If a magnetic tape is used as the magnetic medium, it is caused to pass adjacent to the air gap 13, which is defined by the extensions 31 and 33, the ends of the core legs 23 and 25 and the spacers 35 and 37. Such magnetic tape would pass parallel to the plane of the paper in a direction from the top to the bottom of the sheet, or vice versa.

To perform a recording operation, a series of electrical current pulses is passed through the coil 17, which is commonly called a "write" coil. The coil 19, which can be designated as a "read" coil, is not used during this recording mode of operation. Each of the current pulses in the "write" coil 17 will reach sufficient strength to magnetically saturate that portion of the magnetic medium directly adjacent to the air gap 13, and a record is formed on the magnetic medium in a track which extends the full width of the magnetic core 11.

When the magnetic head is used for reproducing or "reading," the "write" coil 17 is not energized while the "read" coil 19 develops a series of voltage pulses. The relative movement between the magnetic head and the magnetized medium creates magnetic pulses in the core 11 which energizes the "read" coil 19 to produce electrical current pulses corresponding to those recorded previously on the magnetic medium. Since the "read" coil 19 is only wound about core leg 21, however, the effective width of the "read" track is much narrower than the "write" track.

During the "read" mode of operation, only the magnetic flux appearing across the middle portion of the air gap 13, namely, that between the extensions 31 and 33, is effective to induce voltage pulses in "read" coil 19. The core legs 23 and 25 are isolated effectively by the non-magnetic spacers 35 and 37, which spacers prevent magnetic flux lines from crossing from the core legs 23 and 25 to the middle leg 21. Since the "read" coil 19 links only that magnetic flux which is confined to the core leg 21, the effective width of the readout track is determined by the width of that core leg, and thus, any remnants of previously recorded information lying along the edge of the recorded track will not affect the "read" signal adversely.

In designing the magnetic head of the present invention for any particular application, the widths of the "read" and "write" tracks may be chosen individually and can be set to any width by increasing or decreasing the number of laminations in any of the core legs 15, 21, 23 and 25. The only requirement is that the number of laminations of the total width of one-half of the magnetic head, as defined by core leg 15, be substantially the same width as the combination of the three core legs 21, 23 and 25 in the other half of the magnetic head.

The above description is of a preferred embodiment of the invention, and many modifications may be made thereto without departing from the spirit and scope of the invention, which is defined in the appended claims.

What is claimed is:

1. A magnetic transducer head comprising,
a magnetic core having an air gap,
said air gap being defined on one side by a first portion of magnetic permeable material for the full width of said head,
said air gap being defined on the other side by a second portion of magnetic permeable material for a width less than the full width of said head,
means to magnetically interconnect the bases of said first and second portions to form a first magnetic circuit including the portion of the air gap defined by the first and second portions, and
said air gap being further defined on said other side by a third portion of magnetic permeable material,
said last-mentioned portion having a predetermined width so that along with the width of the second portion it extends to the full width of said head, and
means to magnetically interconnect the base of said third portion and the base of said first portion to form a second magnetic circuit including the portion of the air gap defined by the first and third portions.

2. A magnetic transducer head as defined in claim 1, in which said first and second portions are substantially C-shaped, and said third portion is substantially I-shaped.

3. A magnetic transducer head for recording and reproducing data comprising,
a magnetic core having an air gap and a predetermined width,
said air gap being defined on one side by a substantially C-shaped portion of magnetic permeable material for the full width of said head,
said air gap being defined on the other side by a substantially C-shaped portion of magnetic permeable material for a width less than the full width of said head,
means to magnetically interconnect the bases of said C-shaped portions to form a first magnetic circuit including said lesser width portion of said air gap,
said air gap being further defined on the other side by a pair of substantially I-shaped portions of magnetic permeable material,
said I-shaped portions having predetermined widths so that said other side of the air gap extends to the full width of said head,
means to magnetically interconnect the bases of said I-shaped portions with said one side C-shaped portion to form a second magnetic circuit including said portion of the air gap defined by said I-shaped portions and said one side C-shaped portion, and means between the upper sections of said other side C-shaped portion and each of said I-shaped portions for preventing magnetic flux interference between said first magnetic circuit and said second magnetic circuit.

4. The magnetic transducer head as defined in claim 3, further comprising, a first coil wound on said one side C-shaped portion for providing data to be recorded by said transducer head, and a second coil wound on said other side C-shaped portion for providing data which is reproduced by said transducer head.

References Cited

UNITED STATES PATENTS 3,171,107 2/1965 Rogers ----------- 179—100.2

BERNARD KONICK, *Primary Examiner.*

R. SNIDER, *Assistant Examiner.*